(12) United States Patent
Chen et al.

(10) Patent No.: US 8,281,600 B2
(45) Date of Patent: Oct. 9, 2012

(54) THIMBLE, SLEEVE, AND METHOD FOR COOLING A COMBUSTOR ASSEMBLY

(75) Inventors: Wei Chen, Greer, SC (US); Stephen Robert Thomas, Simpsonville, SC (US); Geoffrey David Myers, Simpsonville, SC (US); Vijay Kumar Turaga, Hyderabad (IN)

(73) Assignee: General Electric Company, Schenectady, NY (US)

(*) Notice: Subject to any disclaimer, the term of this patent is extended or adjusted under 35 U.S.C. 154(b) by 907 days.

(21) Appl. No.: 11/621,197

(22) Filed: Jan. 9, 2007

(65) Prior Publication Data

US 2010/0251723 A1   Oct. 7, 2010

(51) Int. Cl.
*F02C 1/00* (2006.01)
(52) U.S. Cl. .............................. 60/772; 60/752
(58) Field of Classification Search ............ 60/752–760, 60/39.37
See application file for complete search history.

(56) References Cited

U.S. PATENT DOCUMENTS

| | | | | |
|---|---|---|---|---|
| 2,742,762 | A * | 4/1956 | Kuhring | 60/752 |
| 3,886,735 | A * | 6/1975 | Irwin | 60/753 |
| 3,899,882 | A * | 8/1975 | Parker | 60/752 |
| 3,934,408 | A * | 1/1976 | Irwin | 60/753 |
| 4,132,066 | A * | 1/1979 | Austin et al. | 60/752 |
| 4,133,633 | A * | 1/1979 | Fehler et al. | 431/352 |
| 4,301,657 | A * | 11/1981 | Penny | 60/748 |
| 4,916,906 | A | 4/1990 | Vogt | |
| 5,201,650 | A * | 4/1993 | Johnson | 431/9 |
| 5,533,864 | A * | 7/1996 | Nomoto et al. | 416/96 A |
| 5,687,572 | A * | 11/1997 | Schrantz et al. | 60/753 |
| 5,737,915 | A | 4/1998 | Lin et al. | |
| 6,029,455 | A * | 2/2000 | Sandelis | 60/752 |
| 6,484,505 | B1 | 11/2002 | Brown et al. | |
| 6,494,044 | B1 | 12/2002 | Bland | |
| 6,532,744 | B1 | 3/2003 | Reiter et al. | |
| 6,890,148 | B2 | 5/2005 | Nordlund | |
| 7,010,921 | B2 | 3/2006 | Intile et al. | |
| 7,047,723 | B2 | 5/2006 | Martling et al. | |
| 2005/0268613 | A1 | 12/2005 | Intile et al. | |
| 2005/0268615 | A1 | 12/2005 | Bunker et al. | |
| 2006/0101801 | A1 | 5/2006 | Bland | |

FOREIGN PATENT DOCUMENTS

| | | |
|---|---|---|
| JP | 58210413 A | 12/1983 |
| JP | 01208616 A | 8/1989 |
| JP | 09041991 A | 2/1997 |
| JP | 2001289442 A | 10/2001 |

OTHER PUBLICATIONS

CN Office Action, for corresponding CN Application No. 200810001369.9, Jun. 4, 2010.

(Continued)

*Primary Examiner* — Phutthiwat Wongwian
(74) *Attorney, Agent, or Firm* — Armstrong Teasdale LLP (57) ABSTRACT

A method for cooling a combustor assembly having a cooling passage. The method includes providing at least one thimble including an inner surface that defines a first opening, a second opening that is downstream from the first opening, and a flow channel that extends between the first opening and the second opening. The flow channel has a converging portion and a recovery portion that is downstream from the converging portion. The method also includes inserting the at least one thimble into at least one inlet that is defined in at least one sleeve such that cooling air is discharged from the flow channel into the cooling passage.

20 Claims, 9 Drawing Sheets

OTHER PUBLICATIONS

JP Office Action dated Mar. 14, 2012 from corresponding Application No. 2008-000884 along with unofficial English translation.

CN Office Action issued in corresponding CN Application No. 200810001369.9 on Feb. 1, 2011.

* cited by examiner

Figure 1:
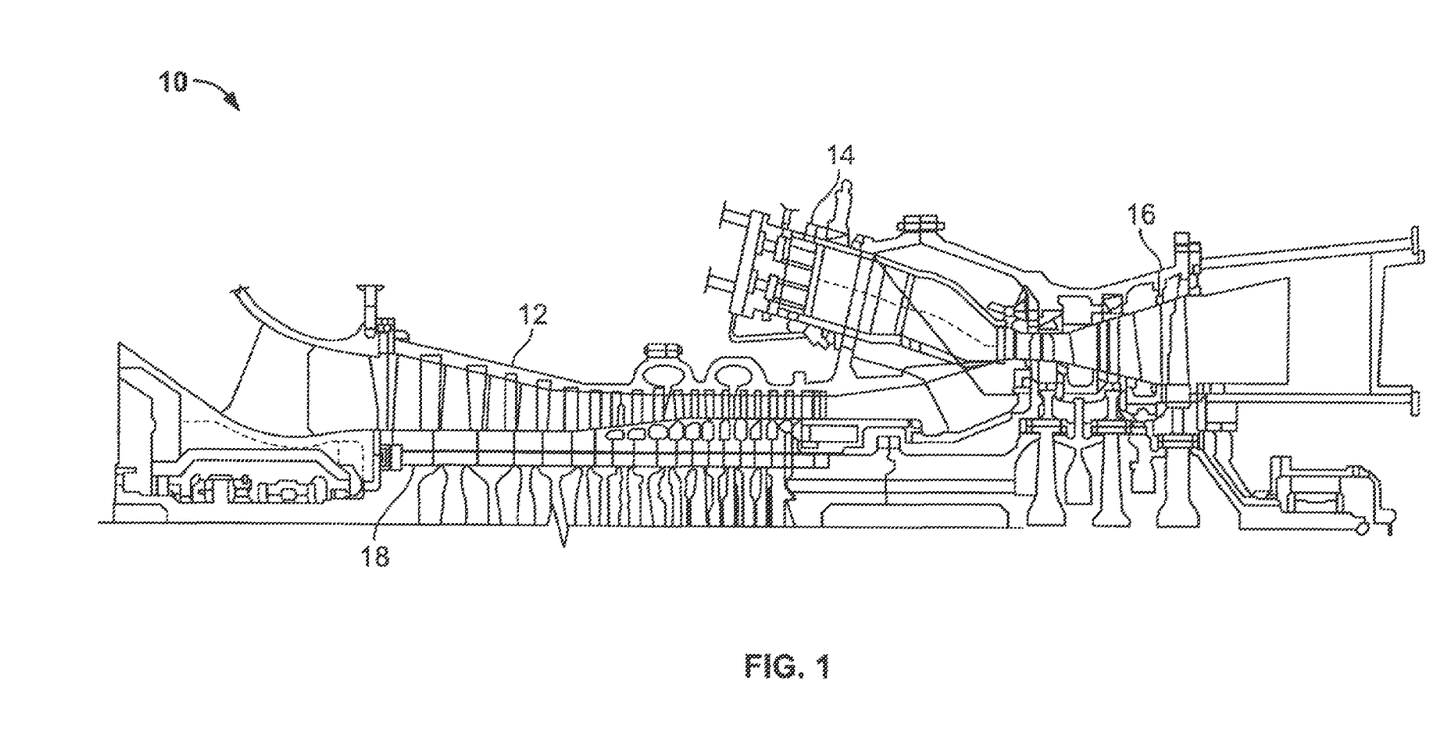
FIG. 1 is a schematic cross-sectional illustration of an exemplary gas turbine engine.

FIG. 16 ately only, and that embodiments of the present invention are not limited to engine 10 and may instead be implemented within any gas turbine engine or heated system that requires cooling in a similar manner described herein.

THIMBLE, SLEEVE, AND METHOD FOR COOLING A COMBUSTOR ASSEMBLY

BACKGROUND OF THE INVENTION

This invention relates generally to gas turbine engines and more particularly, to cooling combustor assemblies for use with gas turbine engines.

At least some known gas turbine engines use cooling air to cool a combustion assembly within the engine. Often the cooling air is supplied from a compressor coupled in flow communication with the combustion assembly. In at least some known gas turbine engines, the cooling air is discharged from the compressor into a plenum extending at least partially around an impingement sleeve and a flow sleeve which extends over a transition piece and combustor liner, respectively, of the combustor assembly. Cooling air from the plenum flows through inlets of these sleeves and enters into cooling passages that are defined between the impingement sleeve and the transition piece (the transition passage) and between the combustor liner and flow sleeve (the liner passage). Cooling air flowing through the transition passage is discharged into the liner passage. Cooling air from the plenum is channeled through inlets of the sleeves into the liner passage in order to cool the combustor assembly. The cooling air, which is heated by the metal surface of the transition piece and/or the combustor liner, is then mixed with fuel for use by the combustor.

It is desirable that the combustion liner and transition piece are evenly cooled in order to protect the mechanical properties and prolong the operative life of the combustion liner and transition piece. At least some known flow sleeves and impingement sleeves include inlets that are shaped or configured to facilitate the flow of cooling air through them. Other inlets are filled with open-ended thimbles that are configured to direct the cooling air into the cooling passages at an angle that is substantially perpendicular to the flow of the cooling air already in the channels. For both of these options, the air flowing through the passages may lose axial momentum, due to the opposing flow orientations, and may also create a barrier to the momentum of the cooling air entering from the plenum.

BRIEF DESCRIPTION OF THE INVENTION

In one aspect, a method for cooling a combustor assembly having a cooling passage is provided. The method includes providing at least one thimble including an inner surface that defines a first opening, a second opening that is downstream from the first opening, and a flow channel that extends between the first opening and the second opening. The flow channel has a converging portion and a recovery portion that is downstream from the converging portion. The method also includes inserting the at least one thimble into at least one inlet that is defined in at least one sleeve such that cooling air is discharged from the flow channel into the cooling passage.

In another aspect, a thimble for channeling cooling air into a cooling passage of a combustor assembly is provided. The thimble includes an outer surface, and an opposite inner surface that defines a first opening, a second opening downstream from the first opening, and a flow channel extending therebetween. The flow channel comprises a converging portion and a recovery portion downstream from the converging portion. The converging portion has a diameter that decreases from the first opening to the recovery portion, and the recovery portion has a substantially constant diameter therethrough.

In a further aspect, a sleeve having at least one projection configured to channel cooling air into a cooling passage of a combustor assembly is provided. The at least one projection includes an outer surface, and an opposite inner surface that defines a first opening, a second opening downstream from the first opening, and a flow channel extending therebetween. The flow channel includes a converging portion and a recovery portion downstream from the converging portion. The converging portion has a diameter that decreases from the first opening to the recovery portion, and the recovery portion has a substantially constant diameter therethrough.

DETAILED DESCRIPTION OF THE INVENTION

FIG. 1 is a schematic cross-sectional illustration of an exemplary gas turbine engine 10. Engine 10 includes a compressor assembly 12, a combustor assembly 14, a turbine assembly 16 and a common compressor/turbine rotor shaft 18. It should be noted that engine 10 is exemplary only, and that embodiments of the present invention are not limited to engine 10 and may instead be implemented within any gas turbine engine or heated system that requires cooling in a similar manner described herein.

In operation, air flows through compressor assembly 12 and compressed air is discharged to combustor assembly 14 for mixing with fuel and cooling parts of combustor assembly 14. Combustor assembly 14 injects fuel, for example, natural gas and/or fuel oil, into the air flow, ignites the fuel-air mixture to expand the fuel-air mixture through combustion and generates a high temperature combustion gas stream. Combustor assembly 14 is in flow communication with turbine assembly 16, and discharges the high temperature expanded gas stream into turbine assembly 16. The high temperature expanded gas stream imparts rotational energy to turbine assembly 16 and because turbine assembly 16 is rotatably coupled to rotor 18, rotor 18 subsequently provides rotational power to compressor assembly 12.

Figure 2:
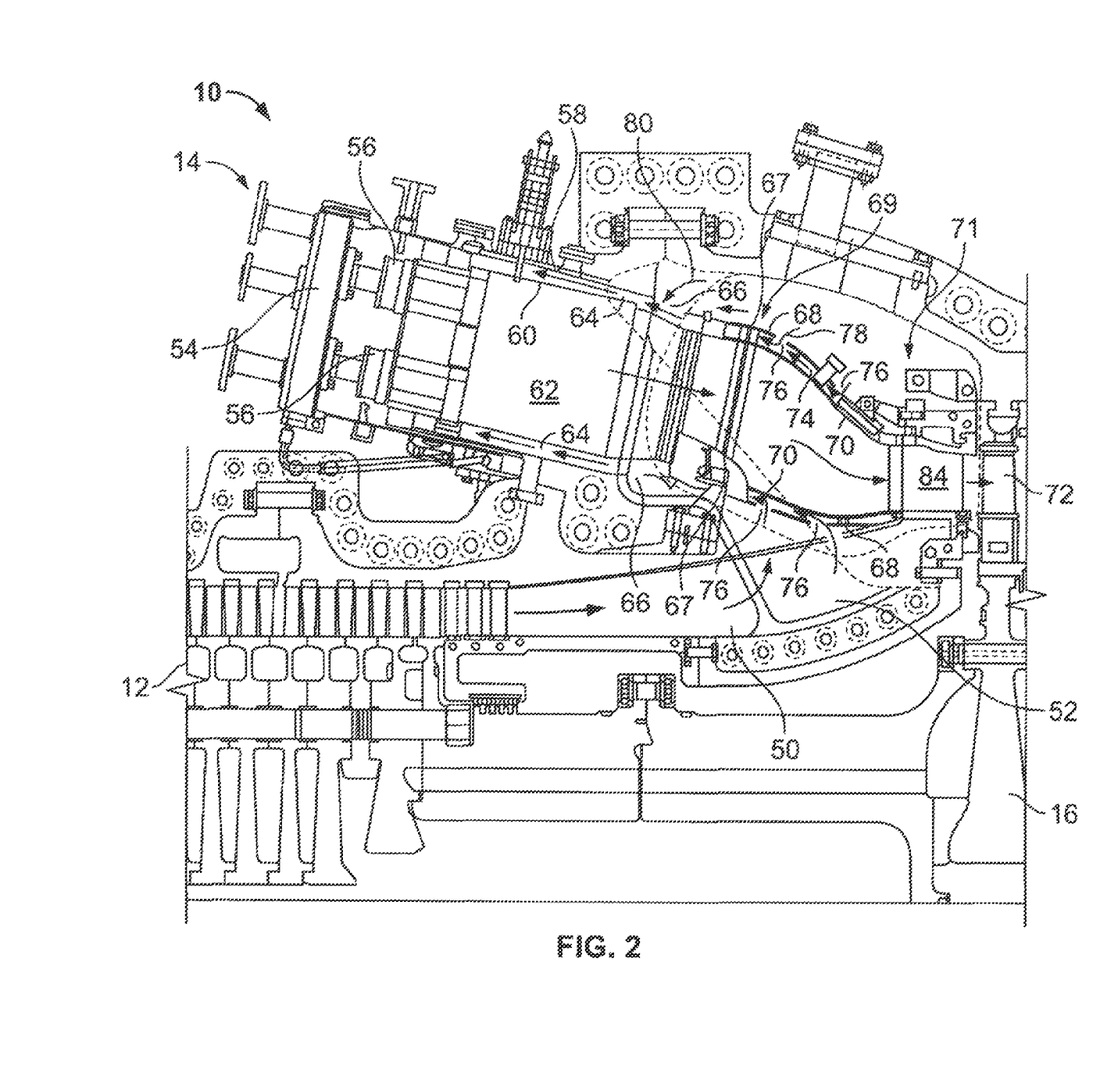
FIG. 2 is an enlarged cross-sectional illustration of a portion of an exemplary combustor assembly that may be used with the gas turbine engine shown in FIG. 1.

FIG. 2 is an enlarged cross-sectional illustration of a portion of combustor assembly 14. Combustor assembly 14 is coupled in flow communication with turbine assembly 16 and with compressor assembly 12. Compressor assembly 12 includes a diffuser 50 and a discharge plenum 52 that are coupled to each other in flow communication to channel air through combustor assembly 14 as discussed further below.

Combustor assembly 14 includes a substantially circular dome plate 54 that at least partially supports a plurality of fuel nozzles 56. Dome plate 54 is coupled to a substantially cylindrical combustor flow sleeve 58 with retention hardware (not shown in FIG. 2). A substantially cylindrical combustor liner 60 is positioned within flow sleeve 58 and is supported via flow sleeve 58. Liner 60 defines a substantially cylindrical combustor chamber 62. More specifically, liner 60 is spaced radially inward from flow sleeve 58 such that an annular combustion liner cooling passage 64 is defined between flow sleeve 58 and combustor liner 60. Flow sleeve 58 defines a plurality of inlets 66 which enable a portion of air flow from compressor discharge plenum 52 to flow into cooling passage 64.

An impingement sleeve 68 is coupled to and substantially concentric with combustor flow sleeve 58 at an upstream end 69 of impingement sleeve 68. A transition piece 70 is coupled to a downstream end 67 of impingement sleeve 68. Transition piece 70, along with liner 60, facilitates channeling combustion gases generated in chamber 62 downstream to a turbine nozzle 84. A transition piece cooling passage 74 is defined between impingement sleeve 68 and transition piece 70. A plurality of openings 76 defined within impingement sleeve 68 enable a portion of air flow from compressor discharge plenum 52 to be channeled into transition piece cooling passage 74.

In operation, compressor assembly 12 is driven by turbine assembly 16 via shaft 18 (shown in FIG. 1). As compressor assembly 12 rotates, it compresses air and discharges compressed air into diffuser 50 as shown in FIG. 2 (airflow is indicated by the arrows). In the exemplary embodiment, a portion of air discharged from compressor assembly 12 is channeled through compressor discharge plenum 52 towards combustion chamber 62, and another portion of air discharged from compressor assembly 12 is channeled downstream for use in cooling engine 10 components. More specifically, a first flow leg 78 of the pressurized compressed air within plenum 52 is channeled into transition piece cooling passage 74 via impingement sleeve openings 76. The air is then channeled upstream within transition piece cooling passage 74 and discharged into combustion liner cooling passage 64. In addition, a second flow leg 80 of the pressurized compressed air within plenum 52 is channeled around impingement sleeve 68 and injected into combustion liner cooling passage 64 via inlets 66. Air entering inlets 66 and air from transition piece cooling passage 74 is then mixed within liner cooling passage 64 and is then discharged from liner cooling passage 64 into fuel nozzles 56 wherein it is mixed with fuel and ignited within combustion chamber 62.

Flow sleeve 58 substantially isolates combustion chamber 62 and its associated combustion processes from the outside environment, for example, surrounding turbine components. The resultant combustion gases are channeled from chamber 62 towards and through a cavity of transition piece 70 that channels the combustion gas stream towards turbine nozzle 84.

Figure 3:
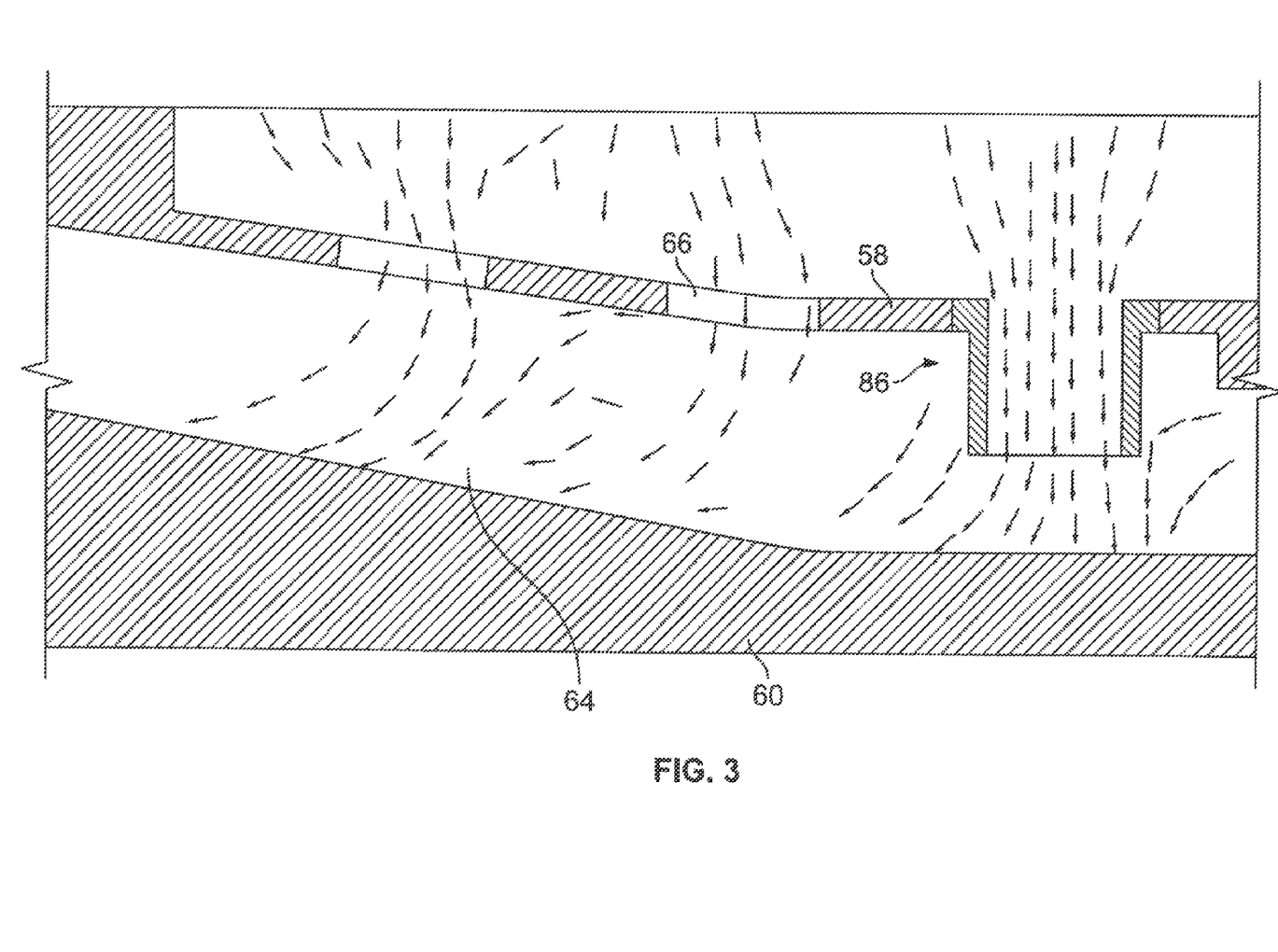
FIG. 3 is a cross-sectional view of a liner passage as compressed cooling air enters the passage.

FIG. 3 is a cross-sectional view of liner cooling passage 64 as the compressed air enters liner cooling passage 64 through flow sleeve 58 via inlets 66. At least some known systems utilize a straight thimble 86 or thimbles 86 positioned within and covering inlet 66 for directing compressed air into liner cooling passage 64. Thimbles 86 facilitate heat transfer by directing the compressed air further into liner cooling passage 64 and creating a greater likelihood that the cool compressed air will reach liner 60 (also referred to as impinging liner 60). Although FIG. 3 illustrates compressed air entering liner cooling passage 64 through inlets 66 with and without thimbles 86, a similar configuration can be used in directing compressed air into transition piece cooling passage 74.

When compressed air enters either transition piece cooling passage 74 or liner cooling passage 64, pressure loss will occur. Some of this pressure loss is useful because it maximizes heat transfer, such as the loss that occurs when the airflow mixes with the passage airflow and/or impinges upon the liner 60 or transition piece 70. However, other pressure loss is wasted due to dump losses or turning losses.

Figure 4:
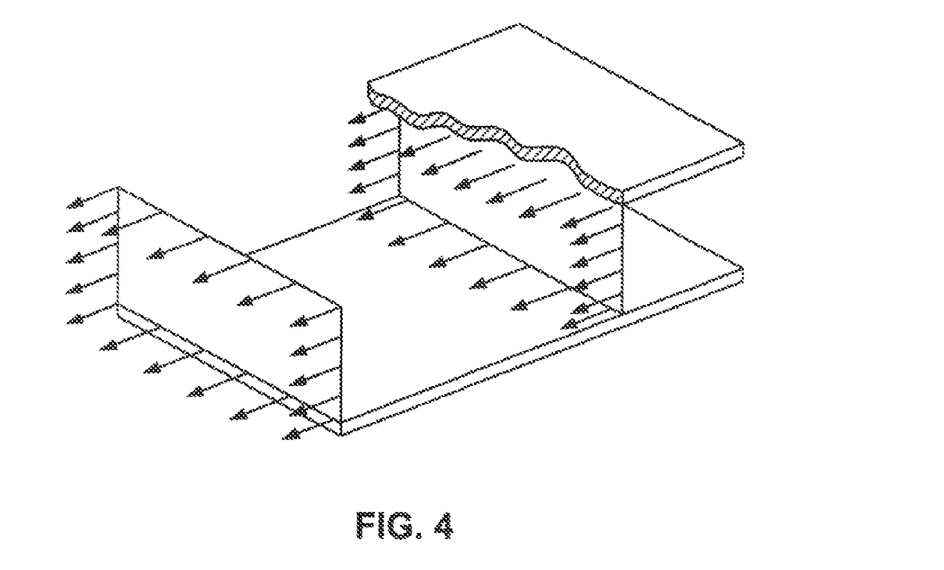
FIG. 4 illustrates a parallel flow of air that may be formed in the liner passage shown in FIG. 3.
Figure 5:
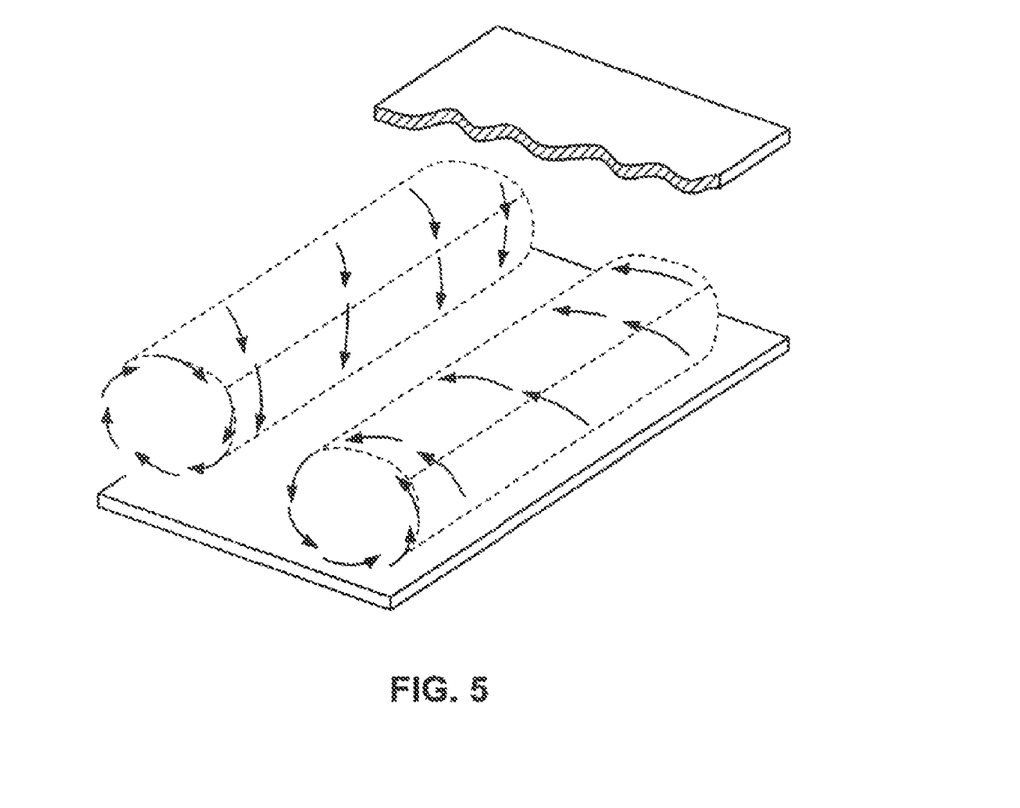
FIG. 5 illustrates a turbulent airflow that may be formed in the liner passage shown in FIG. 3.

In order to facilitate maximizing useful pressure loss and minimizing wasted pressure loss, thimbles 86, liner cooling passage 64, and transition piece cooling passage 74 can be configured to maintain a Taylor-Gortler type of flow. FIGS. 4 and 5 illustrate a parallel flow and a Taylor-Gortler type of flow of air, respectively, with the arrows indicating the direction of airflow. A parallel airflow may lead to less mixing with the passage airflow and less impinging with the liner or transition piece than a Taylor-Gortler airflow.

Figure 6:
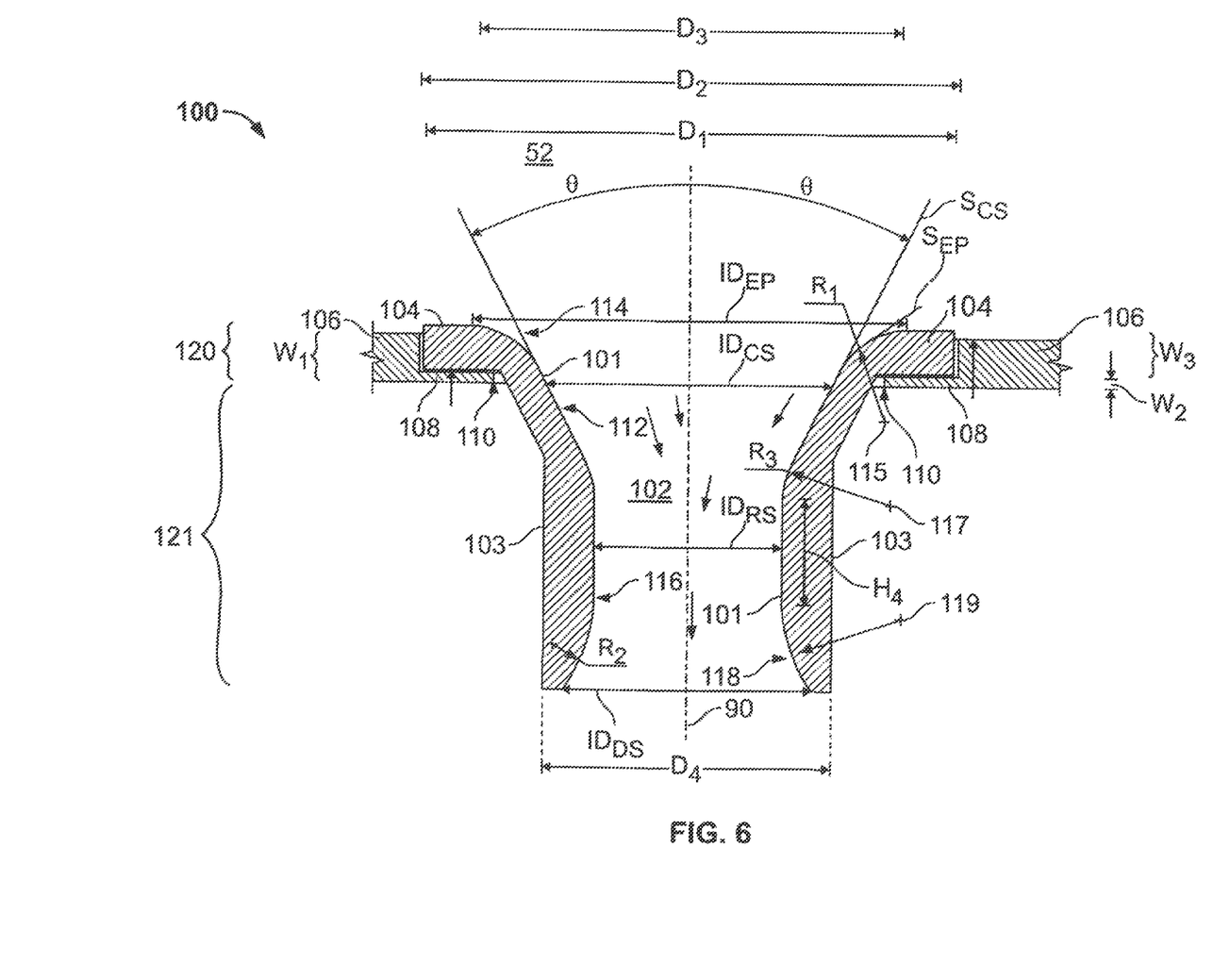
FIG. 6 illustrates an exemplary embodiment of a thimble that may be used with the liner passage of FIG. 3.

Embodiments of the present invention can be used to cool the combustor assembly, reduce the amount of pressure loss, and lessen the dynamics of the combustor assembly. FIG. 6 illustrates an exemplary embodiment of a thimble 100. Thimble 100 has an inner surface 101 and an outer surface 103. At least a portion of inner surface 101 defines a flow channel 102 that passes therebetween. Although embodiments of the thimble 100 described herein can have many shapes and configurations (discussed further below), in FIG. 6 thimble 100 is substantially circular and centered on a longitudinal axis 90. Generally, compressed air flows through flow channel 102 from plenum 52 to a cooling passage 107 (not shown in FIG. 6), such as transition piece cooling passage 74 or liner cooling passage 64. Thimble 100 includes a lip portion 104. In some embodiments, lip portion 104 is substantially circular and has an outside diameter $D_1$. Lip portion 104 engages a sleeve 106. Sleeve 106 can be any sleeve, liner, or wall that separates two chambers. In FIG. 6 sleeve 106 is impingement sleeve 68 or flow sleeve 58, or any sleeve used to cool a combustor assembly.

Although the thimbles illustrated herein appear separate or removable from sleeve 106, embodiments of the present invention also include thimbles that are integrated into sleeve 106 (i.e., coupled or secured to sleeve 106) and sleeves 106 that are manufactured to define or form projections that are similar in shape to the thimbles described herein.

Generally, sleeve 106 has a thickness $W_1$. In some embodiments, in order to engage thimble 100, a ledge portion 108 extends from sleeve 106 and has a thickness $W_2$. $W_2$ is smaller than $W_1$. An end 110 of ledge portion 108 defines an opening of sleeve 106 therebetween, such as inlet 66 shown in FIG. 3. Although the opening can have any configuration, in FIG. 6 the opening is substantially circular. Ledge portion 108 has an outside diameter $D_2$, which is substantially equal to or slightly greater than $D_1$, and has an inside diameter $D_3$, which is less than $D_2$. Ledge portion 108 is configured to engage lip portion 104 and has a similar configuration as lip portion 104, thus allowing lip portion 104 to rest on or be coupled to ledge portion 108 when thimble 100 is in use. Lip portion 104 has a thickness, $W_3$. In one embodiment, $W_3$ is substantially equal to $W_1-W_2$ so that an outer surface of sleeve 106 is substantially smooth.

Flow channel 102 is defined by inner surface 101 and is further illustrated by a plurality of horizontal cross-sections. In some embodiments, horizontal cross-sections of flow channel 102 are substantially circular and each horizontal cross-section has an inner diameter, ID, extending from one point on inner surface 101 through longitudinal axis 90 and to another point on inner surface 101. Furthermore, inner surface 101 is defined by a slope S, which may be viewed relative to longitudinal axis 90 or the ID of a horizontal cross-section.

Thimble 100 includes a converging portion 112 (or converging portion), which is defined as a portion of flow channel 102 that converges or narrows in the direction of airflow (indicated by arrows). Converging portion 112 may also be defined as the portion of thimble 100 where the areas of the horizontal cross-sections decrease as the cross-section moves downstream. As shown in FIG. 6, in some embodiments, the inner diameter of converging portion 112, $ID_{CS}$, for at least a section of the converging portion 112 reduces in a linear fashion such that inner surface 101 has a constant slope $S_{CS}$ that forms an angle $\Theta$ with respect to longitudinal axis 90. This section has a frustoconical shape. For example, in one embodiment the inner surface of thimble 100 forms an angle of about 15° with respect to longitudinal axis 90.

In some embodiments, $S_{CS}$ and $\Theta$ remain constant from the beginning of flow channel 102 to an end of converging portion 112. Alternatively, converging portion 112 includes an inlet section 114 where compressed air from plenum 52 first enters flow channel 102. Inlet section 114 (and, consequently, converging portion 112) begins when:

$$|S_{EP}|>0$$

where $S_{EP}$ is the slope of inner surface 101 for inlet section 114. As shown in FIG. 6, in some embodiments, $S_{EP}$ is smaller than $S_{CS}$ (i.e., $S_{CS}$ is steeper than $S_{EP}$) in order to minimize the pressure loss. Furthermore, horizontal cross-sections of inlet section 114 include an inner diameter, $ID_{EP}$, that reduces in a non-linear manner as the cross-sections progress down flow channel 102.

Thimble 100 also includes a recovery portion 116, which is defined as the portion where the areas of the horizontal cross-sections of flow channel 102 are substantially equal. Recovery portion 116 continues to develop the flow of air into a more uniform distribution. As shown in FIG. 6, inner surface 101 of recovery portion 116 is substantially parallel to longitudinal axis 90. An inner diameter, $ID_{RS}$, of recovery portion 116 is substantially equal throughout and, in some embodiments, is less than the $ID_{CS}$ of the end of converging portion 112.

In some embodiments, thimble 100 includes a diffusing portion 118, which is defined as the section where the areas of the horizontal cross-sections of flow channel 102 increase. Furthermore, an inner diameter of diffusing portion 118, $ID_{DS}$, is greater than $ID_{RS}$. Diffusing portion operates to minimize the potential pressure loss due to expansion.

In some embodiments, inlet section 114 and converging portion 112 intersect at a sharp edge. In other embodiments, inner surface 101 includes a transition portion 115 connecting inlet section 114 to converging portion 112. Transition portion 115 is an arc with a radius, $R_1$, from about 0.01 in. to about 0.2 in. Alternatively, inlet section 114 is equivalent to $R_1$ and connects converging portion 112 to the top surface of lip portion 104.

In some embodiments, converging portion 112 and recovery portion 116 intersect at a sharp edge. In other embodiments, inner surface 101 includes a transition portion 117 connecting converging portion 112 to recovery portion 116. Transition portion 117 is an arc with a radius, $R_3$. $R_3$ is designed to minimize air separation at the entrance to recover portion 116. Generally, $R_3$ is proportional to the Reynolds number ($R_e$) formed from inner surface 101 and the airflow. In one embodiment, $R_3$ is from about 0.01 in. to about 0.2 in.

In some embodiments, recovery portion 116 and diffusing portion 118 intersect at a sharp edge. In other embodiments, inner surface 101 includes a transition portion 119 connecting recovery portion 116 to diffusing portion 118. Transition portion 119 is an arc with a radius, $R_2$. $R_2$ is designed to minimize the separation of air from the surface at the exit. A suitable value for $R_2$ has a complex dependence on at least $ID_{RS}$, $H_4$, $R_e$ for the airflow through the thimble, and a momentum ratio of thimble flow ($M_{THIMBLE}$) and crossflow ($M_{CROSS}$).

Outer surface 103 defines a passage portion 121 of thimble 100 in passage 107 and can have any suitable shape. In one embodiment, a horizontal cross-section of passage portion 121 is substantially circular having a diameter, $D_4$. In one embodiment, $D_4$ is substantially equal throughout thimble 100, except for a flange portion 120 of outer surface 103 that corresponds to a portion of a converging portion 112 of inner surface 101. Similar to $ID_{CS}$, $D_4$ becomes increasingly smaller as the horizontal cross-sections progress downstream.

Figure 7:
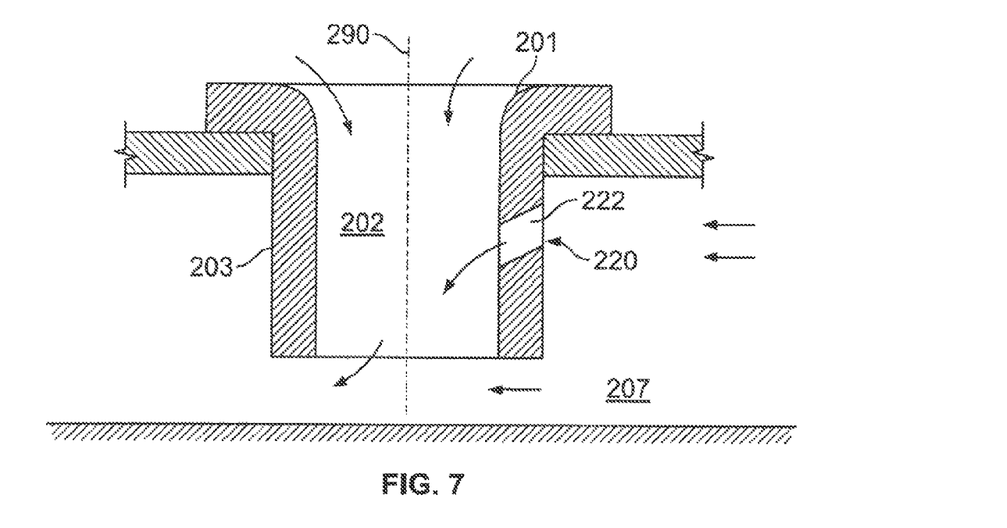
FIG. 7 is a cross-sectional view of a thimble having a pressure opening.
Figure 8:
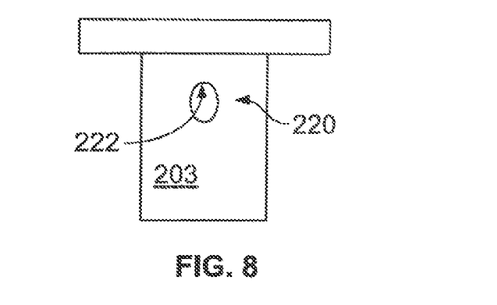
FIG. 8 illustrates a perspective view of the thimble with a pressure opening shown in FIG. 7.
Figure 9:
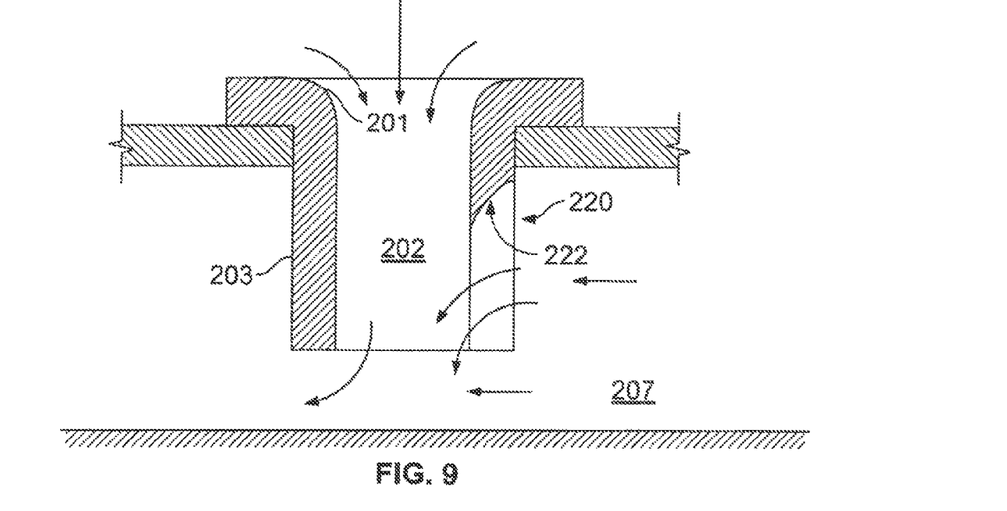
FIG. 9 is a cross-sectional view of an additional pressure opening that may be used with the thimble of FIG. 6.
Figure 10:
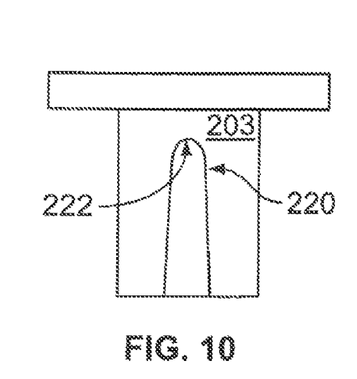
FIG. 10 is a perspective view of the thimble having a pressure opening shown in FIG. 9.

The flow through inlets 66 may act to block the upstream flow in passage 107 producing unnecessary pressure losses. FIGS. 7-10 illustrate pressure openings 220 formed through a wall defined between an outer surface 203 and an inner surface 201 of a thimble 200 that act to minimize these pressure losses from crossflow. Pressure opening 220 facilitates in modulating the airflow in passage 207 through flow channel 202, which is substantially circular and centered around a longitudinal axis 290. Pressure opening 220 directs a portion of the oncoming passage airflow into a channel 202. FIGS. 7 and 8 illustrate pressure opening 220 with an entrance having the shape of a circle. FIGS. 9 and 10 illustrate another embodiment of pressuring opening 220 with an entrance of opening 220 having a parabolic shape and extending downstream thimble 200. As shown in FIGS. 7-10, pressure openings 220 are defined by the walls of thimble 200 and have an upper portion 222. In some embodiments, upper portion 222 is curved downward in the direction of channel airflow.

FIGS. 11-14 illustrate thimbles 300 that may be placed in a sleeve 306 where the airflow in plenum 52 moves at least partially parallel to the outer surface of sleeve 306 or where the airflow in plenum 52 is at least partially perpendicular to the airflow through channel 302.

Figure 11:
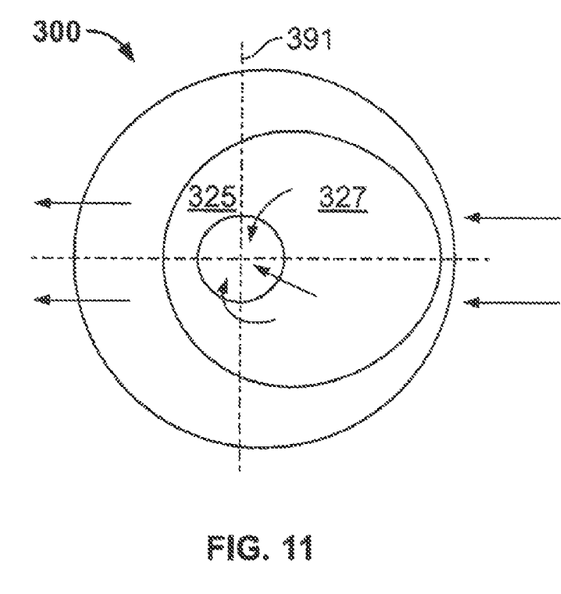
FIG. 11 illustrates a top-plan view of a thimble having a non-symmetrical channel.
Figure 12:
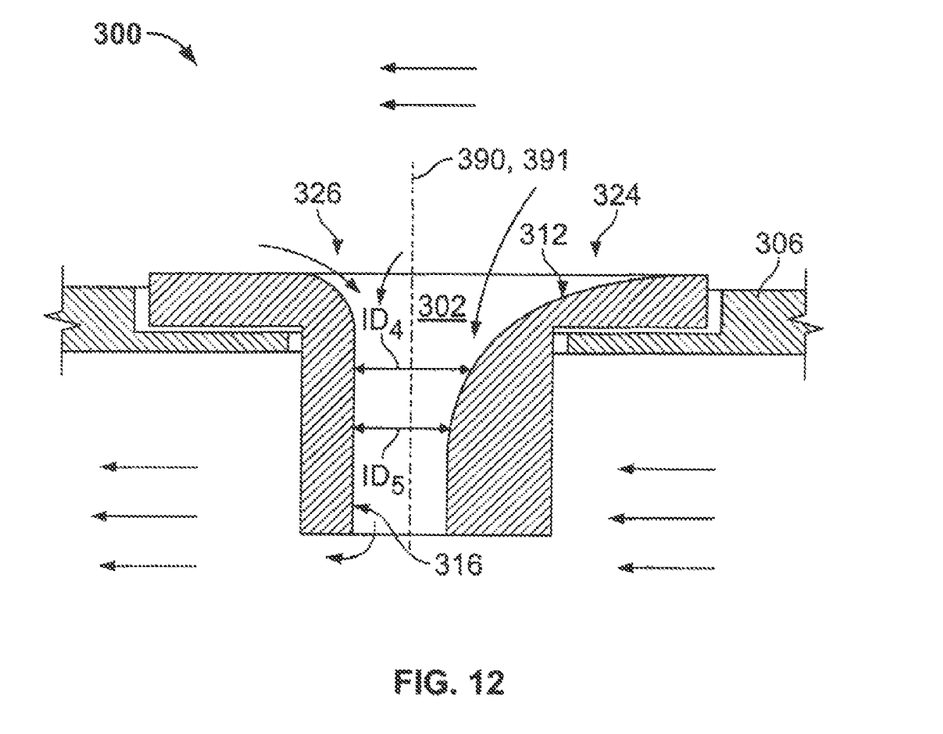
FIG. 12 is a cross-sectional view of the thimble having a non-symmetrical channel shown in FIG. 11.

FIGS. 11 and 12 show thimble 300 having a channel 302 that is non-symmetrical with respect to a longitudinal axis 390 extending through the center of channel 302 (shown in FIG. 12). A vertical plane (indicated by line 391) extending through longitudinal axis 390 divides the volume of channel 302 into a forward portion 324 and an aft portion 326 (shown in FIG. 12) and also divides the areas of the elliptical-shaped or kidney-shaped horizontal cross-sections into a forward area 327 and an aft area 325 (shown in FIG. 11). In non-symmetrical thimble 300, the space defined by channel 302 in forward portion 324 is greater in size than the space defined by channel 302 in aft portion 326. Furthermore, as air flows through a converging portion 312 of channel 302, the areas of the oval-shaped cross-sections reduce in size with a greater reduction occurring in forward area 327. As FIG. 12 illustrates in comparing inner diameters $ID_4$ and $ID_5$, the inner diameter reduces more with respect to forward portion 324 than aft portion 326.

Thimble 300 also includes a recovery portion 316 in which the horizontal cross-sections of channel 302 are substantially circular and the areas of the cross-sections are substantially equal throughout recovery portion 316. Thimble 300 may also include a diffusing portion (not shown in FIG. 11) that is similarly configured to diffusing portion 118 discussed above.

Figure 13:
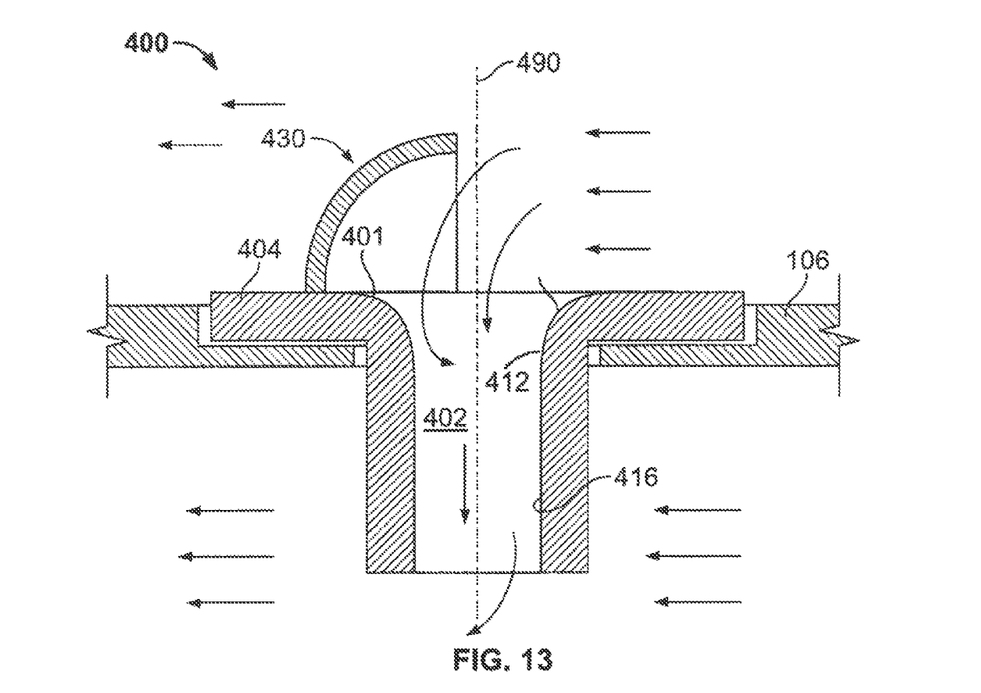
FIG. 13 is a cross-sectional view of a thimble having a scoop member.
Figure 14:
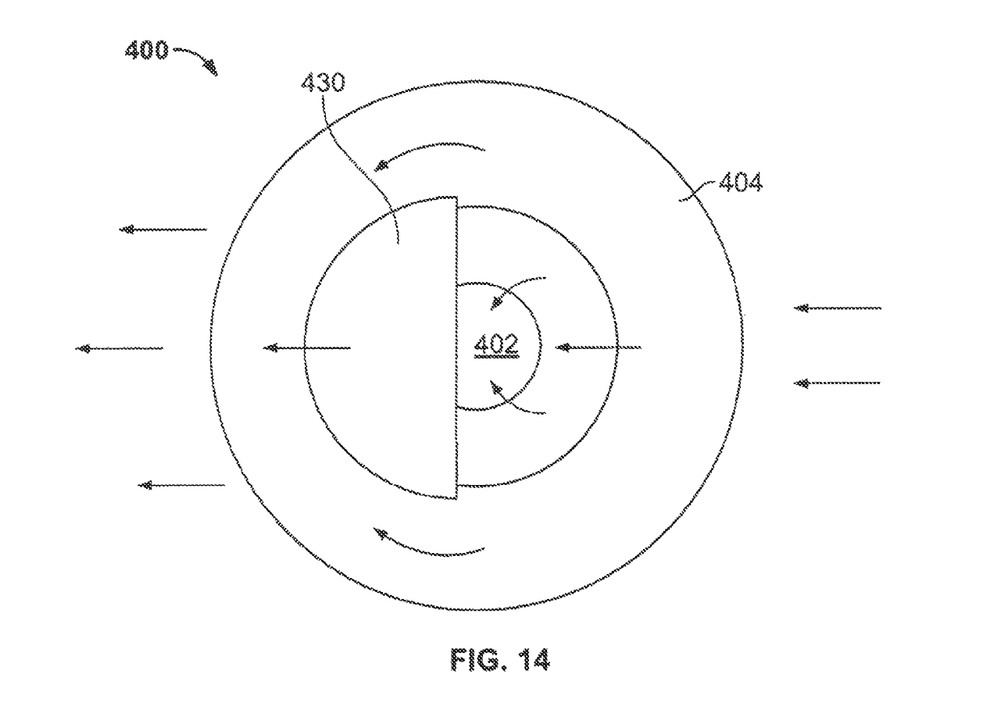
FIG. 14 illustrates a top-plan view of the thimble having a scoop member shown in FIG. 13.

FIGS. 13 and 14 illustrate a thimble 400 in use with a scoop member 430. In FIG. 13, channel 402 includes a converging portion 412 having an inlet section 414 and also includes a recovery portion 416. Although FIG. 13 demonstrates the use of a scoop member with one embodiment of the present invention, many other thimbles may be used with scoop member 430, including, for example, thimbles 100, 200, and 300.

Scoop member 430 redirects air generally flowing parallel to sleeve 106 into channel 402, which is substantially circular and centered around a longitudinal axis 490. Scoop member 430 is configured to cover a portion of the opening to channel 402 and has a curved shape. Although scoop member 430 can have many shapes for directing air into channel 402, in one embodiment, scoop member 430 is substantially shaped like a quarter-portion of a hollowed sphere. Scoop member 430 is coupled to or secured to a top surface of lip portion 404 near the opening of channel 402 or is coupled to or secured to inner surface 401 near the opening of channel 402.

Figure 15:
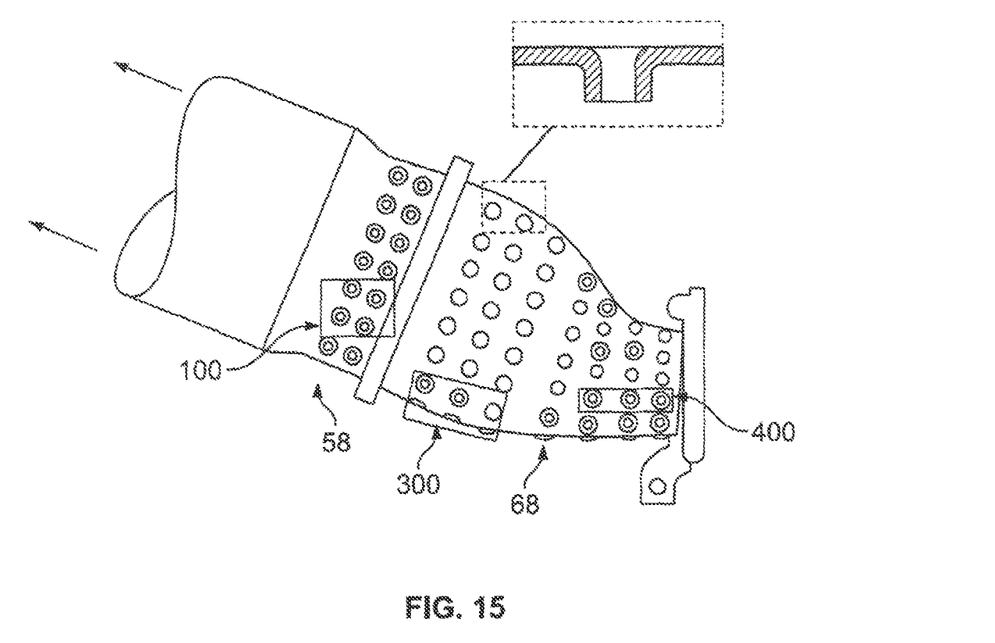
FIG. 15 illustrates an exemplary configuration for a flow sleeve and an impingement sleeve having thimbles such as those shown in FIGS. 6-14.

FIG. 15 illustrates one possible configuration for a flow sleeve 58 and an impingement sleeve 68. Flow sleeve 58 includes thimbles 100 in order to minimize the pressure loss. Impingement sleeve 68 includes non-symmetrical thimbles 300 to increase the airflow without a penalty in pressure loss. Scooped thimbles 400 are also used in order to increase the flow rates at certain areas of the impingement sleeve or flow sleeve where the outside airflow is parallel to the surface of the sleeve.

Figure 16:
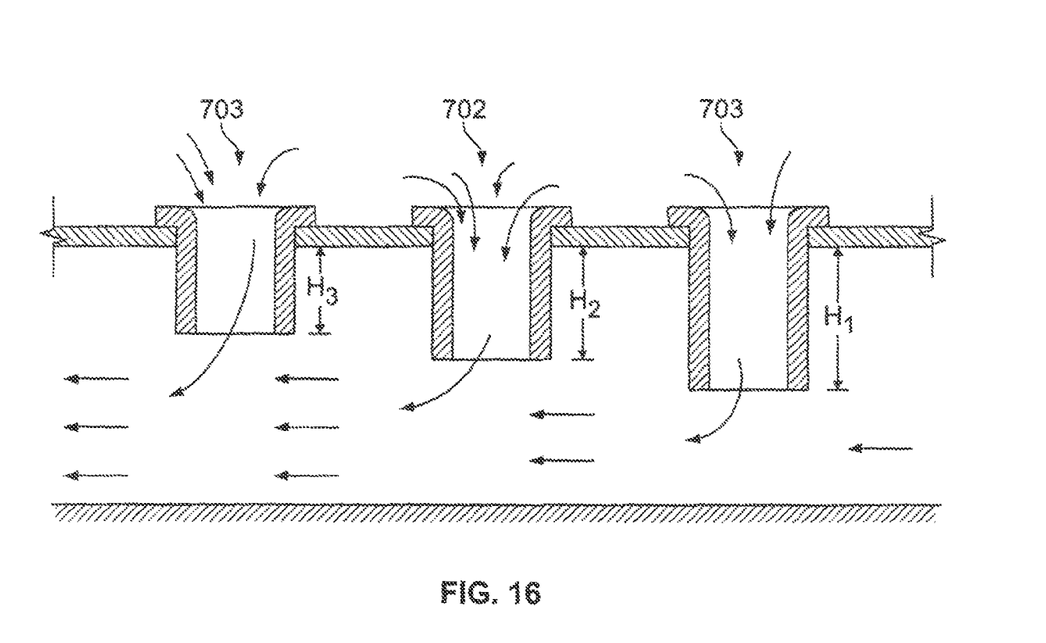
FIG. 16 illustrates the use of the thimbles having varying depths used in conjunction with each other.

Furthermore, throughout flow sleeve 58 and impingement sleeve 68 different sizes and configurations of the variety of thimbles described herein may be used to optimize the cooling and airflow. For example, in FIG. 16 thimbles 703, 702, and 701 have varying depths, $H_3$, $H_2$, and $H_1$, respectively. Thimble 701 is further upstream and has a greater depth, $H_1$, than the other thimbles. Downstream the pressure is even lower, thus thimble 703 having a depth $H_3$ is more appropriate. The interactions between upstream thimbles and downstream thimbles are such that the upstream thimbles create a lower pressure field at the downstream thimbles, which in turn increases the flow through the downstream thimbles.

Embodiments of the present invention can also be used to reduce the coupling of pressure oscillations between the sleeve passages and diffuser plenum, which can be characterized as acoustic impedance. In general, impedance can be described as:

$$Z = \frac{p'}{q'},$$

where Z is the impedance of the orifice, p' is the incoming acoustic pressure perturbation, and q' is the flow fluctuation caused by p'.

Impedance can also be expressed by steady state quantities such as pressure drop and flow rate:

$$Z = \frac{\Delta P}{Q}$$

where $\Delta P$ is the pressure drop across the orifice, and Q is the flow rate across the orifice. Detailed transient analysis reveals that the impedance of the thimbles resembles a check-valve or a transistor in an electric circuit. When the incoming acoustic wave is in its positive phase, the orifice experiences the pressure drop from the diffuser plenum into the passage, which can be expressed as:

$$Z_{fwd} = \frac{\Delta P_{fwd}}{Q_{fwd}}.$$

However, when the incoming acoustic wave is in its negative phase (p'<0), at a short incidence, the flow fluctuation is actually from the passage into diffuser plenum (q'<0). Unlike the positive phase fluctuation, the negative phase fluctuation experiences the pressure drop from the passage to the diffuser plenum ($\Delta P_{backward}$). Thus, the impedance of a negative phase wave can be described as:

$$Z_{backward} = \frac{\Delta P_{backward}}{Q_{backward}}.$$

From the acoustic wave perspective, thimbles act like a check valve that shuts down when backward flow occurs. Both forward and backward pressure drop ($\Delta P_{forward}$ and $\Delta P_{backward}$) are proportional to the force functions that modulate the diffuser plenum and passages. Those force functions are strongly related to the characteristic length or diameter of an opening. In other words, the geometric dimensions determine the phase and wave number parameters in acoustic propagation. Thus, thimbles increase the differences in lengths for forward and backward acoustic waves, which results in larger differences in the phase angle and wave number of incoming and outgoing acoustic waves. Furthermore, the thimbles reduce the possibility of incoming and outgoing acoustic waves falling in-phase. Such a reduction of acoustic waves through the passages decreases the opportunity of an acoustic occurrence in combustion chamber 62.

The present invention also provides a sleeve having at least one projection configured to channel cooling air into a cooling passage of a combustor assembly. The at least one projection includes an outer surface, and an opposite inner surface that defines a first opening, a second opening downstream from the first opening, and a flow channel extending therebetween. The flow channel includes a converging portion and a recovery portion downstream from the converging portion. The converging portion has a diameter that decreases from the first opening to the recovery portion, and the recovery portion has a substantially constant diameter therethrough.

The present invention also provides a method for cooling a combustor assembly that is at least partially surrounded by at least one sleeve having a plurality of inlets, such as combustor assembly 14. The method includes providing at least one thimble including an inner surface that defines a first opening, a second opening that is downstream from the first opening, and a flow channel that extends between the first opening and the second opening. The flow channel has a converging portion and a recovery portion that is downstream from the converging portion. The method also includes inserting the at least one thimble into at least one inlet that is defined in at least one sleeve such that cooling air is discharged from the flow channel into the cooling passage.

Using embodiments of the present invention, the cooling of transition piece 70 and combustor liner 60 can be optimized such that there is a reduced temperature gradient. Likewise, embodiments of the present invention facilitate reducing pressures losses. Furthermore, because some of the thimbles described herein are removable, the arrangements in the flow sleeve can be altered if any changes are made to the combustion process (e.g., changes to loading schedule, firing temperature, fuel, etc.).

As used herein, an element or step recited in the singular and proceeded with the word "a" or "an" should be understood as not excluding plural said elements or steps, unless such exclusion is explicitly recited. Furthermore, references to "one embodiment" or "an exemplary embodiment" of the present invention are not intended to be interpreted as excluding the existence of additional embodiments that also incorporate the recited features.

Although the apparatus and methods described herein are described in the context of a combustor assembly for a gas turbine engine, it is understood that the apparatus and methods are not limited to combustor assemblies or gas turbine engines. Likewise, the components illustrated are not limited to the specific embodiments described herein, but rather, components of the thimbles can be utilized independently and separately from other components described herein.

While the invention has been described in terms of various specific embodiments, those skilled in the art will recognize that the invention can be practiced with modification within the spirit and scope of the claims.

What is claimed is:

1. A method for cooling a combustor assembly including a cooling passage defined between at least one sleeve and an outer surface of a combustion component, said method comprising:
    providing at least one thimble that includes an outer surface, a lip portion at least partially defined by the outer surface of the at least one thimble, and an inner surface that defines a first opening, a second opening downstream from the first opening, and a flow channel extending therebetween, wherein the flow channel is formed with a converging portion and a recovery portion downstream from the converging portion, a diameter of the converging portion that decreases from the first opening to the recovery portion, a diameter of the recovery portion is substantially constant therethrough;
    inserting the at least one thimble into at least one inlet defined in the at least one sleeve such that the lip portion engages the outer surface of the at least one sleeve, wherein the flow channel is coupled in flow communication with the cooling passage, and such that cooling air discharged from the flow channel facilitates impingement cooling of the combustion component.

2. A method in accordance with claim 1 wherein inserting the at least one thimble into the at least one inlet further comprises inserting a pair of thimbles into a pair of inlets defined in the at least one sleeve such that a line formed by the pair of thimbles substantially aligns with a direction of the cooling passage airflow.

3. A method in accordance with claim 2 wherein inserting a pair of thimbles into a pair of inlets further comprises positioning the thimbles with respect to each other such that the upstream thimble creates a low-pressure area adjacent an opening of the downstream thimble.

4. A method in accordance with claim 1 wherein inserting at least one thimble further comprises inserting at least one thimble including a wall opening into the inlet such that air flowing through the cooling passage discharges into the flow channel of the at least one thimble and facilitates capturing pressure of the air flowing through the cooling passage.

5. A method in accordance with claim 1 wherein said inserting at least one thimble further comprises inserting at least one thimble including a diffusing portion downstream from the recovery portion into the inlet, wherein the diffusing portion facilitates reducing pressure losses of cooling air entering the cooling passage.

6. A thimble for channeling cooling air into a cooling passage of a combustor assembly, said thimble comprising:
    an outer surface extending from a sleeve into the cooling passage defined between said sleeve and an outer surface of a combustion component;
    an opposite inner surface that defines a first opening, a second opening downstream from said first opening, and a flow channel extending therebetween, said flow channel comprises a converging portion and a recovery portion downstream from said converging portion, said converging portion has a diameter that decreases from said first opening to said recovery portion, said recovery portion has a substantially constant diameter therethrough, wherein said flow channel is configured to channel air into the cooling passage; and
    a lip portion at least partially defined by said outer surface and coupled to an outer surface of the sleeve.

7. A thimble in accordance with claim 6 wherein said flow channel further comprises a diffusing portion downstream from said recovery portion, said diffusing portion has a diameter that increases from said recovery portion to said second opening.

8. A thimble in accordance with claim 6 wherein said converging portion comprises a frustoconical section having a diameter that decreases from an upstream end of said frustoconical section to a downstream end of said frustoconical section.

9. A thimble in accordance with claim 8 wherein said converging portion further comprises an inlet section extending from said first opening to said frustoconical section, said inlet section has a diameter that is greater than said frustoconical section diameter.

10. A thimble in accordance with claim 6 further comprising an opening extending between said outer surface and said inner surface, said opening configured to channel air from the cooling passage into said flow channel.

11. A thimble in accordance with claim 10 wherein said wall opening has a substantially circular shape.

12. A thimble in accordance with claim 10 wherein said wall opening has a non-circular shape.

13. A thimble in accordance with claim 6 wherein said first opening is one of elliptical and kidney-shaped.

14. A thimble in accordance with claim 6 wherein said outer surface of said thimble further comprises a flange defined by the lip portion and a passage portion aligned substantially concentrically with and downstream from said flange, each of said flange and said passage portion surrounds said flow channel and has an outer diameter, said flange extends circumferentially around said first opening and at least some of said converging portion, said flange diameter is larger than said passage portion diameter.

15. A sleeve for use with a turbine engine, said sleeve comprising:
- an outer wall at least partially defining a ledge portion; and
- at least one projection extending outward from said outer wall, said at least one projection configured to channel cooling air into a cooling passage of a combustor assembly, said cooling passage defined between said sleeve and an outer surface of a combustion component, said at least one projection comprising:
- an outer surface extending from said outer wall into said cooling passage;
- an opposite inner surface that defines a first opening, a second opening downstream from said first opening, and a flow channel extending therebetween, said flow channel comprises a converging portion and a recovery portion downstream from said converging portion, said converging portion has a diameter that decreases from said first opening to said recovery portion, said recovery portion has a substantially constant diameter therethrough, wherein said flow channel is configured to channel air into said cooling passage; and
- a lip portion at least partially defined by said outer surface of said at least one projection, said lip portion is coupled to said ledge portion of said outer wall.

16. A sleeve in accordance with claim 15 wherein said flow channel further comprises a diffusing portion downstream from said recovery portion, said diffusing portion has a diameter that increases from said recovery portion to said second opening.

17. A sleeve in accordance with claim 15 wherein said converging portion comprises a frustoconical section having a diameter that decreases from an upstream end of said frustoconical section to a downstream end of said frustoconical section.

18. A sleeve in accordance with claim 17 wherein said converging portion further comprises an inlet section extending from said first opening to said frustoconical section, said inlet section has a diameter that is greater than said frustoconical section diameter.

19. A sleeve in accordance with claim 15 wherein said at least one projection comprises a plurality of projections configured to facilitate the development of a turbulent airflow.

20. A sleeve in accordance with claim 15 wherein said at least one projection comprises a plurality of projections configured to reduce combustion dynamics.

* * * * *